United States Patent
Scriber et al.

(10) Patent No.: US 11,652,711 B1
(45) Date of Patent: *May 16, 2023

(54) SYSTEMS AND METHODS FOR PROVIDING INDIVIDUALIZED COMMUNICATION SERVICE

(71) Applicant: Cable Television Laboratories, Inc., Louisville, CO (US)

(72) Inventors: Brian A. Scriber, Denver, CO (US); Brian Stahlhammer, Denver, CO (US); Darshak Thakore, Broomfield, CO (US); Martha Lurie Lyons, Sunnyvale, CA (US); Sanjay Patel, Louisville, CO (US); Stephen Arendt, Longmont, CO (US); Anju Ahuja, Santa Clara, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,694

(22) Filed: Nov. 29, 2021

Related U.S. Application Data

(63) Continuation of application No. 16/689,704, filed on Nov. 20, 2019, now Pat. No. 11,252,049.

(60) Provisional application No. 62/733,873, filed on Sep. 20, 2018.

(51) Int. Cl.
| | | |
|---|---|---|
| H04L 41/5054 | (2022.01) |
| H04L 67/303 | (2022.01) |
| H04L 9/40 | (2022.01) |
| H04L 41/02 | (2022.01) |
| H04L 61/4588 | (2022.01) |
| H04L 12/54 | (2022.01) |

(52) U.S. Cl.
CPC .......... *H04L 41/5054* (2013.01); *H04L 41/02* (2013.01); *H04L 63/08* (2013.01); *H04L 67/303* (2013.01); *H04L 12/5692* (2013.01); *H04L 61/4588* (2022.05)

(58) Field of Classification Search
CPC ............ G06Q 30/0269; G06Q 30/0621; H04L 67/306; H04L 67/14; H04L 67/303; H04L 67/2876; H04L 63/10; H04L 63/0876; H04L 63/102; H04L 47/2433
See application file for complete search history.

(56) References Cited

U.S. PATENT DOCUMENTS

| | | | | |
|---|---|---|---|---|
| 7,003,580 B1 * | 2/2006 | Cook | ................. | H04L 12/5692 709/227 |
| 8,402,147 B2 * | 3/2013 | Bondy | ................ | H04L 61/4588 709/228 |
| 2004/0259534 A1 * | 12/2004 | Chaudhari | ............. | G06Q 30/04 455/414.1 |

(Continued)

*Primary Examiner* — Barbara B Anyan
(74) *Attorney, Agent, or Firm* — PdZ Patent Law, PLLC

(57) ABSTRACT

A method for providing individualized communication service includes (1) recognizing a first client being communicatively coupled to a first local communication network, (2) determining an identity of the first client, (3) transporting first data between the first client and a first operator communication network, using the first local communication network in accordance with a first service profile associated with the first client, and (4) transporting the first data using the first operator communication network in accordance with the first service profile.

20 Claims, 7 Drawing Sheets

(56) References Cited

U.S. PATENT DOCUMENTS

| | | | |
|---|---|---|---|
| 2009/0133090 A1* | 5/2009 | Busse | H04N 21/4755 725/132 |
| 2014/0223538 A1* | 8/2014 | Van De Velde | H04L 12/2867 726/12 |
| 2015/0244560 A1* | 8/2015 | Madem | H04L 69/14 709/223 |
| 2019/0082205 A1* | 3/2019 | Ambrozic | H04N 21/2543 |

* cited by examiner

| Individualized Service Profile 300 ||
|---|---|
| Bandwidth | Low |
| Low-Latency? | Yes |
| QoS? | Yes |
| Security Service? | Yes |
| Origination Address Ctrl. | Address 1 |
| Destination Address Ctrl. | Address 1 |
| Parental Ctrl. Service? | No |

FIG. 3

| Individualized Service Profile 400 ||
|---|---|
| Bandwidth | High |
| Low-Latency? | No |
| QoS? | No |
| Security Service? | Yes |
| Origination Address Ctrl. | - |
| Destination Address Ctrl. | - |
| Parental Ctrl. Service? | Yes |

FIG. 4

| Individualized Service Profile 500 ||
|---|---|
| Bandwidth | Low |
| Low-Latency? | No |
| QoS? | No |
| Security Service? | No |
| Origination Address Ctrl. | Address 2 |
| Destination Address Ctrl. | Address 2 |
| Parental Ctrl. Service? | No |

FIG. 5

| Default Service Profile 600 ||
|---|---|
| Bandwidth | Medium |
| Low-Latency? | No |
| QoS? | No |
| Security Service? | No |
| Origination Address Ctrl. | - |
| Destination Address Ctrl. | - |
| Parental Ctrl. Service? | No |

FIG. 6

| Individualized Service Profile 700 ||
|---|---|
| Bandwidth | Low |
| Low-Latency? | Yes |
| QoS? | Yes |
| Security Service? | Yes |
| Parental Ctrl. Service? | No |

FIG. 7

| Individualized Service Profile 800 ||
|---|---|
| Bandwidth | Low |
| Low-Latency? | Yes |
| QoS? | Yes |
| Security Service? | Yes |
| Origination Address Ctrl. | Address 1 |
| Destination Address Ctrl. | Address 1 |
| Surge Bandwidth? | No |

FIG. 8

SYSTEMS AND METHODS FOR PROVIDING INDIVIDUALIZED COMMUNICATION SERVICE

RELATED APPLICATIONS

This application is a continuation of U.S. patent application Ser. No. 16/689,704, filed on Nov. 20, 2019, which claims benefit of priority to U.S. Provisional Patent Application Ser. No. 62/733,873, filed on Sep. 20, 2018. Each of the aforementioned patent applications is incorporated herein by reference.

BACKGROUND

Broadband communication service has become very common. For example, many residences now receive broadband communication service via a Data Over Cable Service Interface Specification (DOCSIS) network or a digital subscriber line (DSL) network. Optical communication networks and wireless communication networks are also increasingly being used to provide broadband communication service.

Broadband communication service is commonly available in multiple tiers, where service level and cost differs among the tiers. For example, a broadband service operator may offer three tiers of broadband communication service at a given location, where the first tier has a maximum downlink bandwidth of 25 Megabits per second (Mb/s) and a lowest cost, the second tier has a maximum downlink bandwidth of 100 MB/s and a medium cost, and the third tier has a maximum downlink bandwidth of 1 Gigabit per second (Gb/s) and a highest cost. A subscriber to the service, such as a residence or a business, may select a tier which best meets its needs. For example, a residence desiring to minimize cost of broadband communication service may select the first tier, while a residence prioritizing performance may select the third tier.

Broadband communication service is often provided on a "best effort" basis. For example, the operator providing the aforementioned second tier may endeavor to provide a maximum downlink bandwidth of 100 MB/s, but actual downlink bandwidth may occasionally be less than 100 MB/s, such as due to communication network congestion.

BRIEF DESCRIPTION OF THE DRAWINGS

FIG. 3 is a schematic diagram illustrating one possible service profile for a medical device client, according to an embodiment.

FIG. 4 is a schematic diagram illustrating one possible service profile for a streaming content application client, according to an embodiment.

FIG. 5 is a schematic diagram illustrating one possible service profile for a smart light bulb client, according to an embodiment.

FIG. 6 is a schematic diagram illustrating one possible default service profile, according to an embodiment.

FIG. 7 is a schematic diagram illustrating another possible service profile for a medical device client, according to an embodiment.

FIG. 8 is a schematic diagram illustrating another possible service profile for a medical device client, according to an embodiment.

DETAILED DESCRIPTION OF THE EMBODIMENTS

Figure 1:
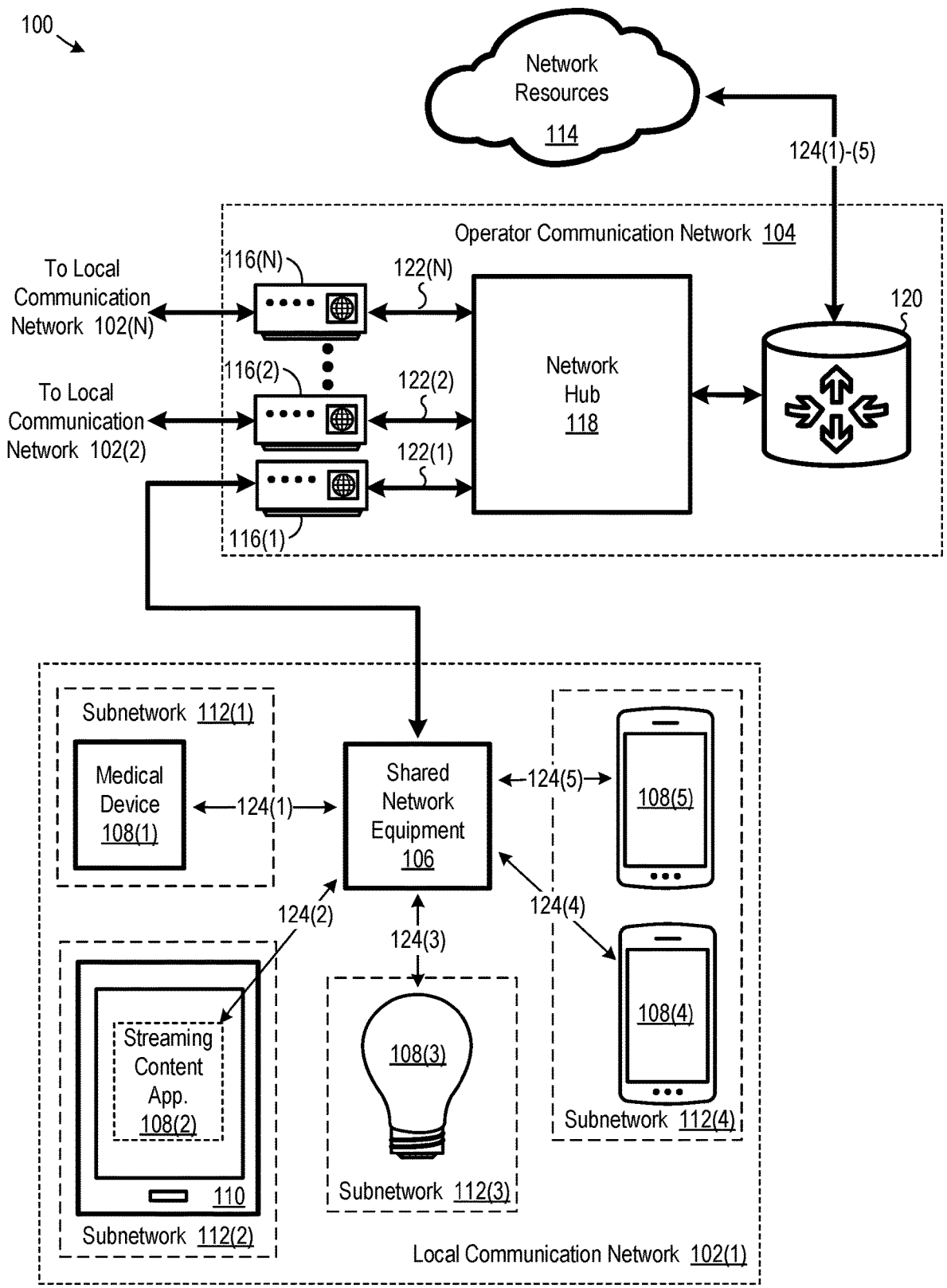
FIG. 1 is a block diagram of a communication system configured to provide individualized communication service, according to an embodiment.

Broadband service operators conventionally provide broadband communication service on a location basis, i.e. they provide service to a particular location, such as to a residence or business. Multiple clients at the location may share the broadband communication service. For example, an operator may provide broadband communication service to a residence, and the service may be shared among multiple people at the residence. Each person, in turn, may have two or more clients, such as mobile phones, computers, entertainment devices, medical devices, security devices, etc., resulting in multiple clients sharing the broadband communication service at the residence. As another example, an operator may provide broadband communication service to a business, and multiple clients at the business, such as computers, voice over internet protocol (VoIP) telephones, conferencing applications, etc., may share the broadband communication service at the business.

Providing broadband communication service on a location basis may result in suboptimal performance and/or suboptimal resource allocation. For example, some clients at a location may receive insufficient broadband communication service, e.g. broadband communication service having insufficient bandwidth and/or unacceptable latency, while other less-demanding clients at the location may receive a higher-level of broadband communication service than needed. Additionally, one client's use of shared broadband communication service may interfere with another client's use of the shared broadband communication service. For example, one client may use a large amount of communication bandwidth, leaving insufficient communication bandwidth for other clients. Furthermore, one or more parties sharing broadband communication service at a location may have to compromise on what tier of broadband communication service to subscribe to. For example, one party may desire a high-performance broadband communication service tier, while another party may desire a low-cost broadband communication service tier.

Moreover, providing broadband communication service on a location basis does not enable a party to receive a consistent broadband service level as the party roams among locations. For example, a person subscribing to 1 Gb/s broadband communication service at their residence will not receive such communication bandwidth when using a communication network at a friend's residence, if the friend subscribes to 10 Mb/s broadband communication service.

Disclosed herein are systems and methods for providing individualized communication service, which may at least partially overcome one or more the above-discussed problems. The new systems and methods can provide communication service on a client basis, i.e. to a particular client, instead of, or in addition to, on a location basis. Therefore, certain embodiments of the new systems and methods can provide individualized communication service for two or more clients at a given location, potentially enabling communication service to be optimized for each client. In particular embodiments, each client is assigned a service profile specifying one or more attributes of the client's communication service, and data associated with the client is transported on both a local communication network and an operator communication network in accordance with the service profile. For example, a client subscribing to high bandwidth service may be assigned a service profile specifying a high-bandwidth tier, and data associated with the client may be transported by a local communication network and an operator communication network in accordance with the high-bandwidth tier, i.e. with one or more attributes specified by the high-bandwidth tier. As another example, a client subscribing to a low latency service may be assigned a service profile specifying a low-latency tier, and data associated with the client may transported by a local communication network and an operator communication network in accordance with the low-latency tier, i.e. with one or more attributes specified by the low-latency tier. Additionally, some embodiments enable a client to roam among different communication networks while receiving a consistent or analogous communication service level.

FIG. 1 is a block diagram of a communication system 100, which is one embodiment of the new communication systems for providing individualized communication service. Communication system 100 includes N local communication networks 102 communicatively coupled to an operator communication network 104, where N is an integer greater than one. In some alternate embodiments, however, communication system 100 only includes a single local communication network 102. In this document, specific instances of an item may be referred to by use of a numeral in parentheses (e.g., local communication network 102(1)) while numerals without parentheses refer to any such item (e.g., local communication networks 102). Details of local communication networks 102(2)-102(N) are not shown in FIG. 1.

In some embodiments, each local communication network 102 is implemented at a single respective location, such as at a single building or a single outdoor site. However, in some other embodiments, at least one local communication network 102 spans multiple buildings and/or multiple outdoor sites, such as a plurality of buildings on a campus. Each local communication network 102 of system 100 need not have the same configuration.

Local communication network 102(1) includes shared network communication equipment 106 and one or more clients 108. Clients 108 may be tangible or intangible. For example, one client 108 may be a tangible information technology device, and another client 108 may be an intangible application running on an information technology device. Examples of clients 108 include, but are not limited to, a mobile telephone, a computer, a set-top device, a data storage device, an Internet of Things (IoT) device, an entertainment device, a computer networking device, a smartwatch, a wearable device with wireless capability, a medical device, a wireless access device (including, for example an evolved NodeB (eNB), a next generation NodeB (gNB), an Institute of Electrical and Electronics Engineers (IEEE) 802.11-based wireless access point, an Integrated Access and Backhaul (IAB) access point, a microcell, a picocell, a femtocell, a macrocell, and IEEE 802.11-based application), an application with communication capability, a software or firmware element with communication capability, etc. FIG. 1 depicts local communication network 102 including five clients 108(1)-108(5), where client 108(1) is a medical device, client 108(2) is a streaming content application running on a tablet computer 110, client 108(3) is an IoT device in the form of a smart lightbulb, client 108(4) is a mobile telephone, and client 108(5) is another mobile telephone. The number of clients 108 and/or the types of clients 108 in local communication network 102(1) may vary without departing from the scope hereof. Additionally, number and/or type of clients 108 may vary among local communication network 102 instances.

Figure 2:
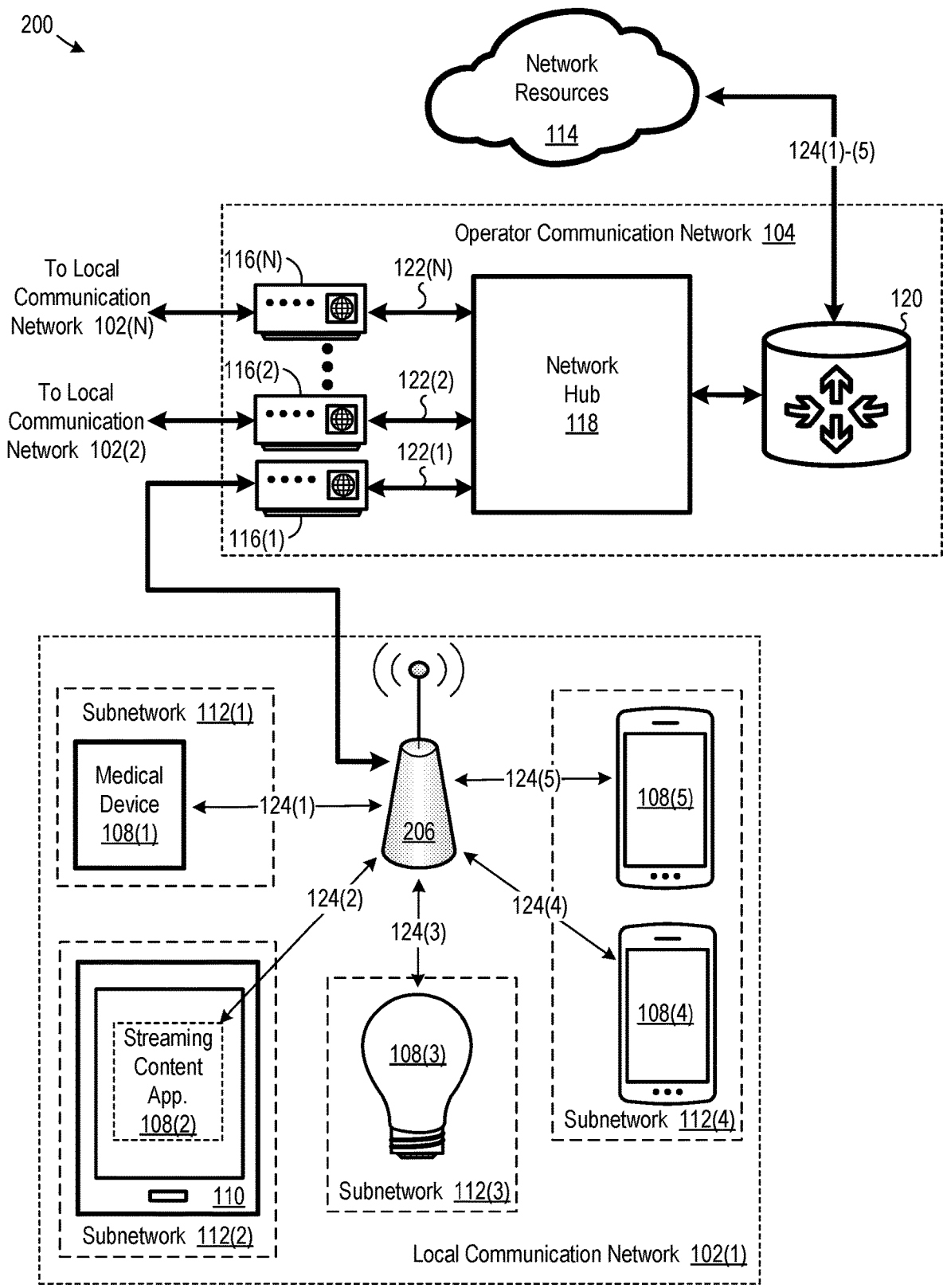
FIG. 2 is a block diagram of an embodiment of the FIG. 1 communication system where shared network equipment includes a wireless access point.

Shared network equipment 106 is shared by all clients 108 of local communication network 102(1), and shared network equipment 106 communicatively couples clients 108 to operator communication network 104. Additionally, in certain embodiments, shared network equipment 106 is capable of transferring data between two or more clients 108 of local communication network 102 without assistance of operator communication network 104. In some embodiments, shared network equipment 106 includes one or more of a switch, a wireless access point, a repeater, a range extender, a hub, a router, electrical cable, and optical cable. For example, in some embodiments, shared network equipment includes a switch (not shown) and one or more Ethernet electrical or optical cables (not shown) communicatively coupling one or more clients 108 to the switch. As another example, FIG. 2 is a block diagram of a wireless communication system 200, which is an embodiment of wireless communication system 100 where shared network equipment 106 includes a wireless access point 206. In some embodiments, wireless access point 206 includes one or more of an IEEE 802.11-based wireless access point, a fourth-generation (4G) wireless access point, a fifth-generation (5G) new radio (NR) wireless access point, and a sixth-generation (6G) wireless access point. Shared network equipment 106 may vary among local communication network 102 instances.

Referring again to FIG. 1, in certain embodiments, shared network equipment 106 is configured to establish at least two subnetworks 112 for transferring data between respective client devices 108 and operator communication network 104. For example, FIG. 1 depicts local network equipment 102 establishing four subnetworks 112, where client 108(1) is a member of subnetwork 112(1), client 108(2) is a member of subnetwork 112(2), client 108(3) is a member of subnetwork 112(3), and clients 108(4) and 108(5) are members of subnetwork 112(4). In certain embodiments, each subnetwork 112 is logically separate from each other subnetwork 112, and in some embodiments, shared network equipment 106 is capable of configuring two or more subnetworks 112 to have different capabilities and/or attributes. For example, in some embodiments, two or more subnetworks 112 have different communication bandwidth, communication latency, communication quality of service (QoS), communication volume, security service, data origination address controls, data destination address controls, parental control service, time of day restrictions, and/or number of connected client 108 restrictions. In particular embodiments, subnetworks 112 are implemented at least partially using one or more techniques disclosed in United States Patent Application Publication Number 2019/0036909 to Cable Television Laboratories, Inc., which is incorporated herein by reference.

Operator communication network 104 is configured to transport data between local communication network 102 and one or more nodes, such as an origination node, a destination node, and/or an intermediate node. An origination node is a node which provides data to a client 108, and a destination node is a node which receives data from a client 108. An intermediate node is a node between an origination node and a destination node, e.g. a node at a peering location. A given node may be both an origination node and a destination node. Additionally, a given node may be an intermediate node as well as an origination node and/or a destination node. Origination, destination, and intermediate nodes may be located, for example, in network resources 114, in operator communication network 104, and/or in a local communication network 102 instance. In some embodiments, network resources 114 include, but are not limited to, the public Internet, voice communication applications, conferencing applications, and/or content delivery applications. Although network resources 114 are illustrated as being separate from operator communication network 104, in certain embodiments, one or more elements of network resources 114 are part of operator communication network 104. Network resources 114 need not be part of system 100.

Operator communication network 104 includes (1) a respective access device 116 for each local communication network 102, (2) a network hub 118, and (3) a router 120. Access device 116(1) is communicatively coupled with shared network equipment 106, and access device 116(1) interfaces local communication network 102(1) with operator communication network 104. In some embodiments, at least one access device 116 is a modem, such as a cable modem (CM) or a DSL modem, and in certain embodiments, at least one access device 116 is an optical network terminal (ONT) or an optical network unit (ONU). Access devices 116 need not all have the same configuration. For example, in some embodiments, access device 116(1) is a modem, and access device 116(2) is an ONT, or vice versa. In some embodiments, operator communication network 104 is configured to transport data at least in partially in accordance with one or more of a DOCSIS communication protocol, a DSL communication protocol, an optical communication protocol, and a wireless communication protocol. Examples of possible optical communication protocols include, but are not limited to, an ethernet passive optical network (EPON) communication protocol, a radio frequency over glass (RFOG) communication protocol, and a gigabit passive optical network (GPON) communication protocol. Examples of possible wireless communication protocols include, but are not limited to, an IEEE 802.11-based wireless communication protocol, a 4G wireless communication protocol, a 5G NR wireless communication protocol, and a 6G wireless access communication protocol.

Although access devices 116 are depicted as being separate from local communication networks 102, in some embodiments, at least one access device 116 shares one or more elements with a respective local communication network 102. Additionally, in certain embodiments, an access device 116 in co-packaged with shared network equipment 106 of a respective local communication network 102. For example, in particular embodiments, access device 116(1) and shared network equipment 106 are co-packaged as a premises gateway device.

Each access device 116 is communicatively coupled to network hub 118 via a communication link 122. Communication links 122 include, for example, coaxial electrical cable, twisted pair electrical cable, optical cable, or a combination of two or more of the aforementioned cables. For example, in particular embodiments, at least one communication link 122 is a hybrid fiber and coaxial cable (HFC) communication link, including optical cable connected between network hub 118 and a fiber node (not shown), and coaxial electrical cable connected between the fiber node and an access device 116 instance. One or more communication links 122 may include a wireless communication link in place of, or in addition to, an electrical or optical cable. Two or more access devices 116 may share a common communication link 122. In some embodiments, network hub 118 includes a wireless or wired relay node, an Ethernet switch, a cable modem termination system (CMTS), an optical line terminal (OLT), a wireless communication termination system (e.g. a packet core or an evolved packet core), a wireless relay system, or a digital subscriber line access multiplexer (DSLAM). Although network hub 118 is depicted as a single element, in some embodiments, network hub 118 includes a plurality of elements, such as a central element and one or more remote elements.

Router 120 is configured to route data between network hub 118 and one or more nodes, including but not limited to origination nodes, destination nodes, and intermediate nodes. Such nodes, for example, are part of network resources 114, local communication networks 102, and/or operator communication network 104. Operator communication network 104 may be modified to include additional or alternative elements without departing from the scope hereof. For example, in some alternate embodiments, router 120 is omitted. As another example, in some embodiments, operator communication network 104 further includes one or more content delivery servers (not shown).

Local communication network 102(1) and/or operator communication network 104 are configured to assign each client 108 a service profile specifying one or more attributes of the client's communication service, such as to provide the client individualized communication service or default communication service. Some possible examples of attributes specified by a service profile include, but are not limited to, one or more of communication bandwidth (e.g., maximum communication bandwidth or minimum communication bandwidth), communication latency (e.g., maximum communication latency), communication quality of service (QoS), communication volume (e.g., maximum amount of data that can transported during a specified time), security service, data origination address controls, data destination address controls, parental control service, and/or time of day restrictions, associated with the first client.

QoS prioritizes transportation of data packets that are high-priority, e.g. time sensitive data packets, over data packets that are not high priority. Security service includes, for example, one or more services to protect privacy and/or integrity of data associated with a client 108. Security service may alternately or additionally include one or more services to protect a client 108 from unauthorized access. Examples of possible security services include, but are not limited to, an encryption service for encrypting data associated with a client 108, and a firewall service for helping prevent unauthorized access to a client 108. Data origination address controls regulate what node or nodes can provide data for a client. For example, data origination address controls may specify what node(s) are permitted to provide data to a client 108, and/or data origination address controls may specify what node(s) are not permitted to provide data to a client 108. Data destination address controls regulate what node or nodes can receive data from a client 108. For example, data destination address controls may specify what node(s) a client 108 is permitted provide data to, and/or data destination address controls may specify what node(s) a client 108 is not permitted to provide data to. Parent control service enables one party, such as a parent, to restrict another party, such as a child, from using one or more aspects of a client 108. Time of day restrictions restrict service available to a client 108, for example, according to time, date, and/or day of week.

FIGS. 3-6 illustrate one set of possible service profiles for clients 108 of local communication network 102(1). Specifically, FIG. 3 is a schematic diagram illustrating an individualized service profile 300, which is one possible service profile for client 108(1), for providing individualized communication service to the client. Client 108(1), which is a medical device, does not require high communication bandwidth, and service profile 300 therefore specifies low communication bandwidth for client 108(1). However, speed and reliability of client 108(1) are important, and service profile 300 accordingly specifies low communication latency and communication QoS for client 108(1), to promote fast and reliable communication. Additionally, data associated with client 108(1) must remain secure, because the data may include personal information. Accordingly, service profile 300 specifies security service for client 108(1).

In the example of FIG. 3, client 108(1) is intended to communicate with only one node, e.g. a node associated with a medical service provider, where the node has an address "Address 1." Therefore, service profile 300 species data origination address controls and data destination address controls. Specifically, service profile 300 species that (a) client 108(1) is permitted to receive data from only a node at Address 1, and (2) client 108(1) is permitted to provide data to only the node at Address 1. In some embodiments, Address 1 is an Internet Protocol (IP) version 4 address or an IP version 6 address. In view of client 108(1) being a medical device, no parental controls are necessary, and service profile 108 therefore specifies no parental control service for client 108(1).

FIG. 4 is a schematic diagram illustrating a service profile 400, which is one possible service profile for client 108(2), for providing individualized communication service to the client. Client 108(2) is a streaming content application which requires high communication bandwidth, and service profile 400 therefore specifies high communication bandwidth for client 108(2). Best effort communication service will suffice for client 108(2), and service profile 400 therefore specifies that low communication latency and communication QoS are not required for the client. In the example of FIG. 4, the party associated with client 108(2) is concerned about security and possible inappropriate use of client 108(2) by children, and service profile 400 therefore specifies both security service and parental control service for client 108(2). Finally, no restrictions on origination or destination of data are desired, and security profile 400 therefore does not specify any origination or destination address controls for client 108(2).

FIG. 5 is a schematic diagram illustrating a service profile 500, which is one possible service profile for client 108(3), for providing individualized communication service to the client. Client 108(3) is a smart light bulb which does not require high-performance communication service, security service, or parental controls. Service profile 500 therefore specifies low communication bandwidth and that low communication latency, communication QoS, security service, and parental controls are not required for client 108(3). Client 108(3) is intended to communicate with only one node, e.g. a node associated with a light bulb supplier, where the node has an address "Address 2." Therefore, service profile 500 species Address 2 for both origination address controls and destination address controls. Consequently, data generated by client 108(3) may only be transported to a node at Address 2, and client 108(3) may only receive data from the node at Address 2, according to service profile 500.

FIG. 6 is a schematic diagram illustrating a service profile 600, which is an example of possible default service profile, i.e. a service profile that is assigned to clients which will not receive individualized communication service. In this example, clients 108(4) and 108(5) will not receive individualized communication service, and each of clients 108(4) and 108(5) is therefore assigned default service profile 600. Service profile 600 specifies medium communication bandwidth and no special services for an associated client.

It should be appreciated that clients 108(1)-108(5) could be assigned service profiles other than those of FIGS. 3-6. Furthermore, a service profile need not specify the same attributes as those of FIGS. 3-6. For example, FIG. 7 is a schematic diagram of a service profile 700, which is another possible service profile for client 108(1). Service profile 700 is like service profile 300 of FIG. 3, but service profile 700 does not include fields for origination address controls or destination address controls. As another example, FIG. 8 is a schematic diagram of a service profile 800, which is another possible service profile for client 108(1). Service profile 800 is like service profile 300 of FIG. 3, but service profile 800 includes a surge bandwidth field in place of a parental control service field. The surge bandwidth field specifies whether client 108(1) is to be provided surge communication bandwidth, i.e. a higher-than-normal communication bandwidth for a limited amount of time, such as to promote high performance during short-term peak demands.

Local communication network 102(1) and operator communication network 104 are each configured to transport data associated with a client 108 according to a service profile of the client 108, i.e. to transport the data in accordance with attributes specified by the service profile, to provide individualized communication service to the client. For example, in one embodiment, local communication network 102(1) and operator communication network 104 are configured to (a) transport data 124(1) associated with client 108(1) in accordance with service profile 300 of FIG. 3, (b) transport data 124(2) associated with client 108(2) in accordance with service profile 400 of FIG. 4, (c) transport data 124(3) associated with client 108(3) in accordance with service profile 500 of FIG. 5, (d) transport data 124(4) associated with client 108(4) in accordance with service profile 600 of FIG. 6, and (e) transport data 124(5) associated with client 108(5) in accordance with service profile 600 of FIG. 6.

More specifically, in the above example, local communication network 102(1) and operator communication network 104 are each configured to transport data 124(1) associated with client 108(1) with low maximum communication bandwidth, low communication latency, communication QoS, and security service, as specified in individualized service profile 300. Additionally, local communication network 102(1) and operator communication network 104 are each configured to limit client 108(1) to communicating with a node at Address 1, as further specified in individualized service profile 300. Furthermore, local communication network 102(1) and operator communication network 104 are each configured to transport data 124(2) associated with client 108(2) at high maximum bandwidth and with security and parental control services, as specified in individualized service profile 400. Moreover, local communication network 102(1) and operator communication network 104 are each configured to transport data 124(3) between client 108(3) and a node at Address 2 with no special services, as specified in individualized service profile 500. Finally, in this example, local communication network 102(1) and operator communication network 104 are each configured to transport data 124(4) associated with client 108(4), as well as to transport data 124(5) associated with client 108(5), at medium maximum bandwidth and with no special services, as specified in default service profile 600. Although FIG. 1 illustrates data 124(1)-(5) being transported between router 120 and network resources 114, data 124(1)-(5) could be transported between router 120 and one or more different locations, without departing from the scope hereof.

Figure 9:
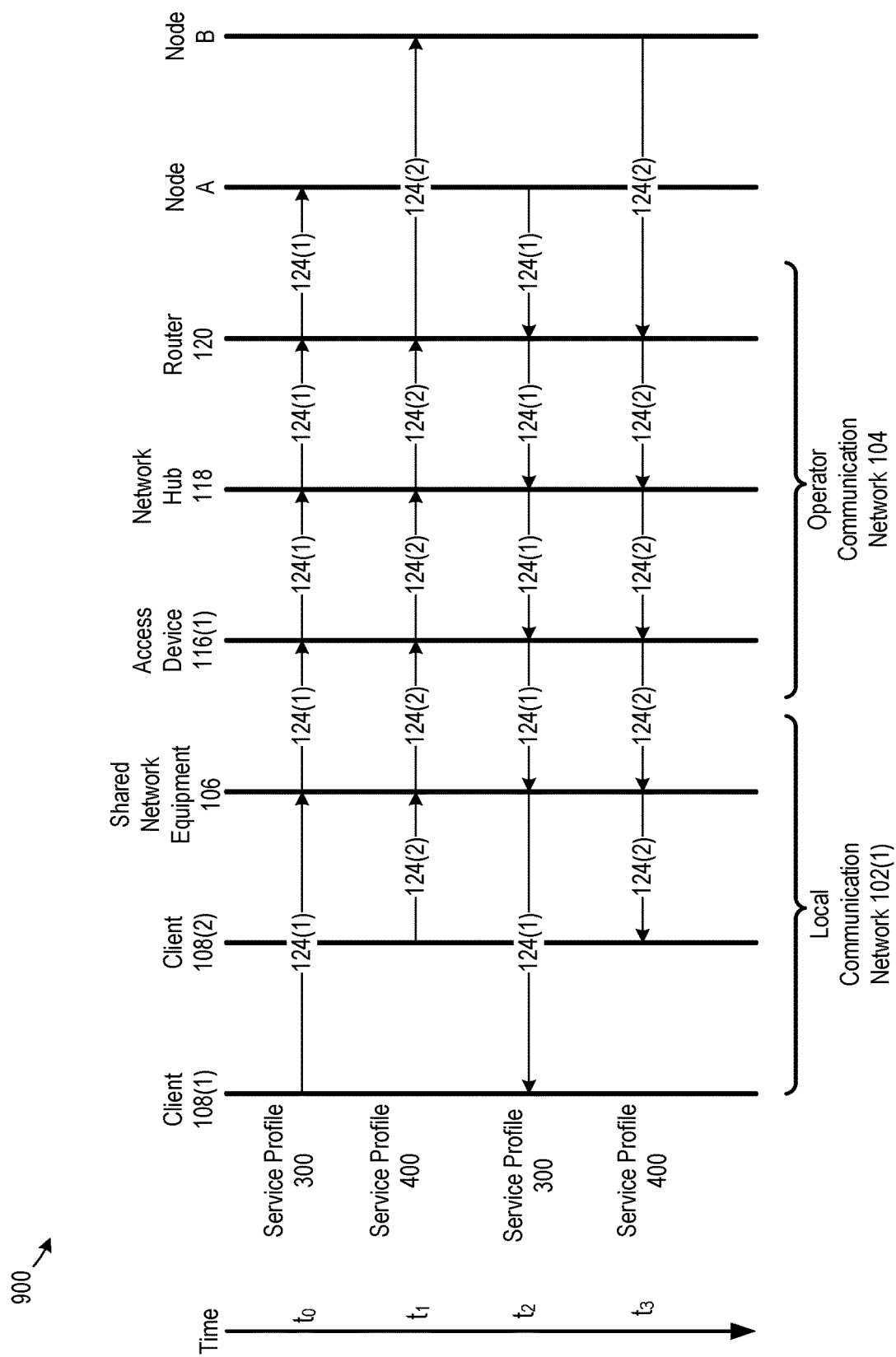
FIG. 9 is a data flow diagram illustrating one example of transporting data in the FIG. 1 communication system, according to an embodiment.

FIG. 9 is a data flow diagram 900 illustrating one example of transporting data associated with clients 108(1) and 108(2) in communication system 100. It should be noted, though, that operation of communication system 100 is not limited to the FIG. 9 example. At time $t_0$, local communication network 102(1) transports data 124(1) from client 108(1) to operator communication network 104 in accordance with service profile 300, and operator communication network 104 transports data 124(1) from local communication network 102(1) to node A in accordance with service profile 300. Specifically, client 108(1) transports data 124(1) to shared network equipment 106, e.g. via subnetwork 112(1), and shared network equipment 106 transports data 124(1) to access device 116(1). Access device 116(1) transports data 124(1) to network hub 118, and network hub 118 transports data 124(1) to router 120. Router 120 transports or routes data 124(1) to node A. Node A is, for example, an origination node, a destination node, or an intermediate node. Although node A is depicted as being external to operator communication network 104, node A could be within operator communication network 104 without departing from the scope hereof. Furthermore, data 124(1) could traverse additional nodes between router 120 and node A.

At time $t_1$, local communication network 102(1) transports data 124(2) from client 108(2) to operator communication network 104 in accordance with service profile 400, and operator communication network 104 transports data 124(2) from local communication network 102(1) to node B in accordance with service profile 400. Specifically, client 108(2) transports data 124(2) to shared network equipment 106, e.g. via subnetwork 112(2), and shared network equipment 106 transports data 124(2) to access device 116(1). Access device 116(1) transports data 124(2) to network hub 118, and network hub 118 transports data 124(2) to router 120. Router 120 transports or routes data 124(2) to node B. Node B is, for example, an origination node, a destination node, or an intermediate node. Although node B is depicted as being external to operator communication network 104, node B could be within operator communication network 104 without departing from the scope hereof. Furthermore, data 124(2) could traverse additional nodes between router 120 and node B.

At time $t_2$, operator communication network 104 transports data 124(1) from node A to local communication network 102(1) in accordance with service profile 300, and local communication network 102(1) transports data 124(1) from operator communication network 104 to client 108(1) in accordance with service profile 300. Specifically, router 120 receives data 124(1) from node A, and router 120 transports data 124(1) to network hub 118. Network hub 118 transports data 124(1) to access device 116(1), and access device 116(1) transports data 124(1) to shared network equipment 106. Shared network equipment 106 transports data 124(1) to client 108(1), e.g. via subnetwork 112(1).

At time $t_3$, operator communication network 104 transports data 124(2) from node B to local communication network 102(1) in accordance with service profile 400, and local communication network 102(1) transports data 124(2) from operator communication network 104 to client 108(2) in accordance with service profile 400. Specifically, router 120 receives data 124(2) from node B, and router 120 transports data 124(2) to network hub 118. Network hub 118 transports data 124(2) to access device 116(1), and access device 116(1) transports data 124(2) to shared network equipment 106. Shared network equipment 106 transports data 124(2) to client 108(2), e.g. via subnetwork 112(2).

Figure 10:
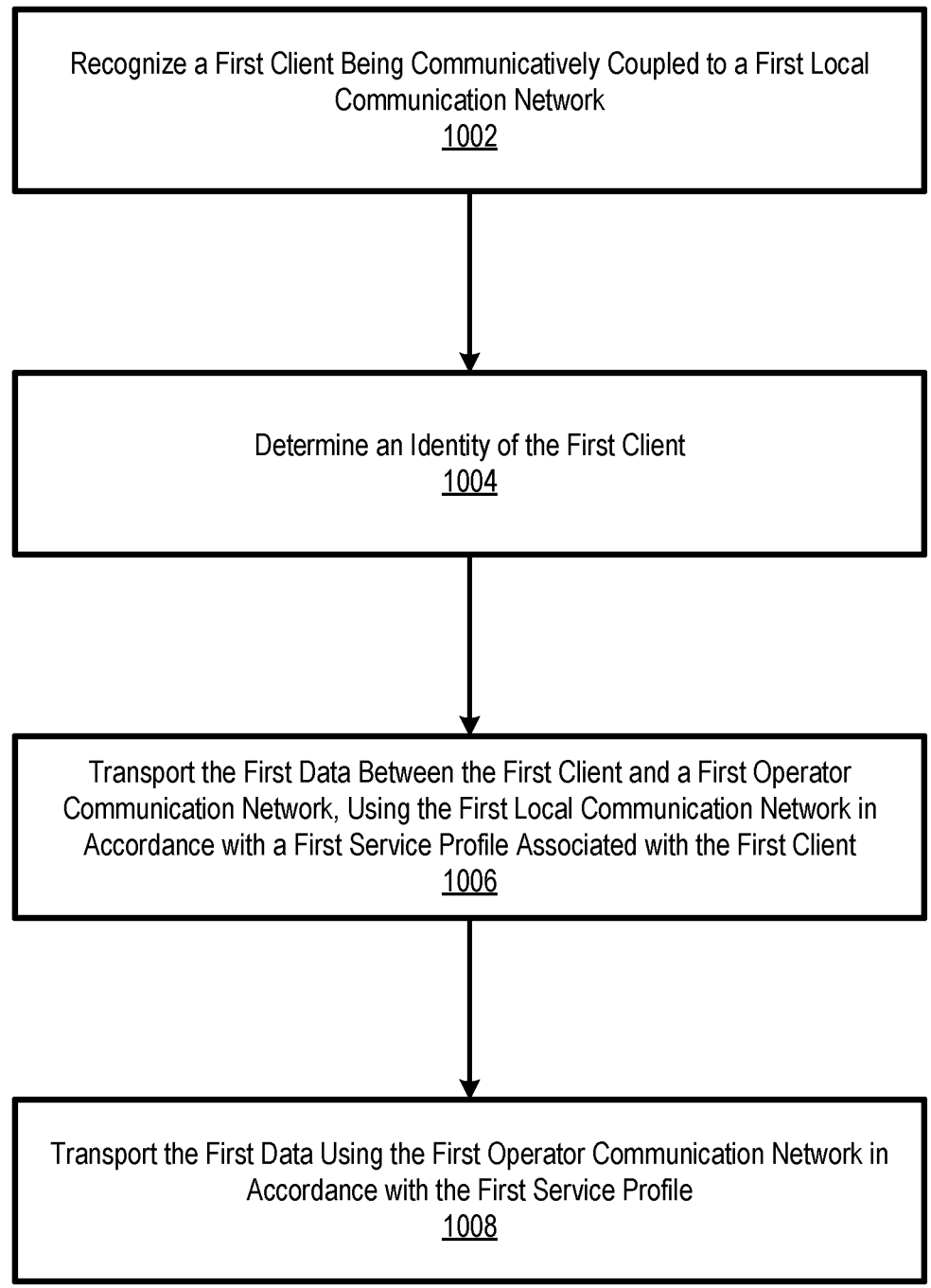
FIG. 10 is a flow chart illustrating a method for providing individualized communication service, according to an embodiment.

FIG. 10 is a flow chart illustrating a method 1000 for providing individualized communication service. Although method 1000 is discussed in the context of system 100, method 1000 is not limited to use with system 100. Additionally, system 100 is not limited to use with method 1000.

In a block 1002 of method 1000, a first client being communicatively coupled to a first local communication network is recognized. In one example of block 1002, shared network equipment 106 recognizes medical device client 108(1) being communicatively coupled to local communication network 102(1). In another example of block 1002, shared network equipment 106 recognizes streaming content application client 108(2) being communicatively coupled to local communication network 102(1). In another example of block 1002, shared network equipment 106 recognizes mobile telephone client 108(4) being communicatively coupled to local communication network 102(1). In a block 1004 of method 1000, an identity of the first client is determined. In one example of block 1004, local communication network 102(1), operator communication network 104, and/or another communication network (not shown) determine an identity of medical device client 108(1), using, for example, one or more security certificates associated with medical device client 108(1) and/or a subscriber identity module (SIM) associated with medical device client 108(1). In another example of block 1004, local communication network 102(1), operator communication network 104, and/or another communication network (not shown) determine an identity of streaming content application client 108(2), using, for example, one or more security certificates associated with streaming content application client 108(2) and/or a SIM associated with streaming content application client 108(2). In another example of block 1004, local communication network 102(1), operator communication network 104, and/or another communication network (not shown) determine an identity of mobile telephone client 108(4), using, for example, one or more security certificates associated with mobile telephone client 108(4) and/or a SIM associated with mobile telephone client 108(4). In some embodiments, local communication network 102(1), operator communication network 104, and/or another communication network (not shown) determine an identity of one or more clients 108 at least partially using techniques disclosed in United States Patent Application Publication Number 2018/0255050 to Cable Television Laboratories, Inc., which is incorporated herein by reference.

In a block 1006 of method 1000, first data is transported between the first client and a first operator communication network, using the first local communication network in accordance with a first service profile associated with the first client. In one example of block 1006, local communication network 102(1) transports data 124(1) between medical device client 108(1) and operator communication network 104 in accordance with service profile 300, 700, or 800, e.g. using subnetwork 112(1). In another example of block 1006, local communication network 102(1) transports data 124(2) between streaming content application client 108(2) and operator communication network 104 in accordance with service profile 400, e.g. using subnetwork 112 (2). In another example of block 1006, local communication network 102(1) transports data 124(4) between mobile telephone client 108(4) and operator communication network 104 in accordance with default service profile 600, e.g. using subnetwork 112(4). In a block 1008 of method 1000, the first data is transported using the first operator communication network in accordance with the first service profile. In one example of block 1008, data 124(1) is transmitted by operator communication network 104 according to service profile 300, e.g. from local communication network 102(1) to node A, as illustrated in FIG. 9. In another example of block 1008, data 124(2) is transmitted by operator communication network 104 according to service profile 400, e.g. from local communication network 102(1) to node B, as illustrated in FIG. 9. In another example of block 1008, data 124(4) is transmitted by operator communication network 104 according to default service profile 600.

Referring again to FIG. 1, in some embodiments, location communication networks 102 and/or operator communication network 104 are configured to provide one or aspects of individualized and/or default service to clients 108 without use of service profiles. For example, in certain embodiments, at least one subnetwork 112 is configured to limited number of clients 108 in the subnetwork, and/or impose time of day restrictions on clients 108, without requiring such limitation to be specified in a service profile.

Figure 11:
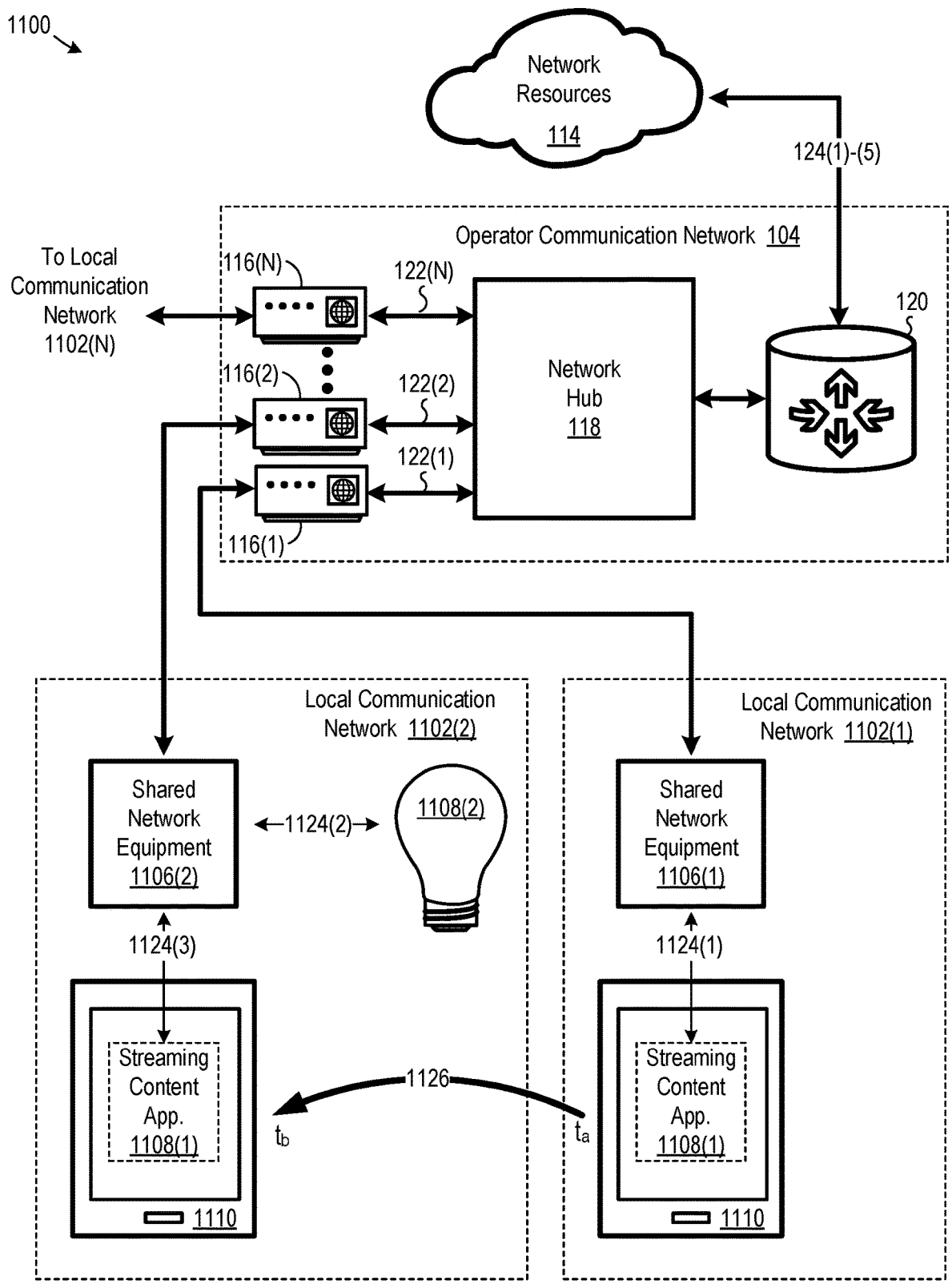
FIG. 11 is a block diagram of an embodiment of the FIG. 1 communication system configured to support roaming of clients among local communication networks.

Some embodiments of system 100 are configured such that a client 108 receives communication service in accordance with its respective service profile even as the client roams from one local communication network 102 to another local communication network 102. For example, FIG. 11 is a block diagram of a communication system 1100, which is an embodiment of communication system 100 that is configured to support roaming of clients among local communication networks 102. System 1100 includes an instance of operator communication network 104 and N local communication networks 1102, where local communication networks 1102 are embodiments of local communication networks 102 of FIG. 1.

Local communication network 1102(1) includes shared network equipment 1106(1), and at time $t_a$, local communication network 1102(1) further includes a streaming content application client 1108(1) operating on a tablet computer 1110. Local communication network 1102(1) may include additional clients 1108 without departing from the scope hereof. Shared network equipment 1106(1) is an embodiment of shared network equipment 106 of FIG. 1, and shared network equipment 1106(1) is communicatively coupled to access device 116(1). At time $t_a$, local communication network 1102(1) transmits data 1124(1) between streaming content application client 1108(1) and operator communication network 104 in accordance with a service profile associated with client 1108(1), e.g. service profile 400 of FIG. 4. In some embodiments, shared network equipment 1106(1) additionally recognizes streaming content application client 1108(1) being communicatively coupled to local communication network 1102(1), and local communication network 1102(1), operator communication network 104, and/or another network (not shown) determine an identity of client 1108(1), such as in a manner similar to that discussed above with respect to FIG. 10.

Local communication network 1102(2) includes shared network equipment 1106(2) and smart light bulb client 1108(2), at time $t_a$. Local communication network 1102(1) may include additional clients 1108 without departing from the scope hereof. Shared network equipment 1106(2) is an embodiment of shared network equipment 106 of FIG. 1, and shared network equipment 1106(2) is communicatively coupled to access device 116(2). Local communication network 1102(2) transports data 1124(2) between smart light bulb client 1108(2) and operator communication network 104 in accordance with a service profile associated with client 1108(2), e.g. service profile 500 of FIG. 5.

As discussed above, streaming content application client 1108(1) is in local communication network 1102(1) at time $t_a$. However, streaming content application client 1108(1) (and tablet computer 1110) roam from local communication network 1102(1) to local communication network 1102(2) at time $t_b$, as indicated by an arrow 1126. Local communication network 1102(2) transmits data 1124(3) between streaming content application client 1108(1) and operator communication network 104 in accordance with the same service profile associated with client 1108(1) in local communication network 1102(1), e.g. service profile 400 of FIG. 4. Consequently, streaming content application client 1108(1) receives consistent communication service as it roams from local communication network 1102(1) to local communication network 1102(2). In some embodiments, shared network equipment 1106(2) additionally recognizes streaming content application client 1108(1) and smart light bulb 1108(2) being communicatively coupled to local communication network 1102(1), and local communication network 1102(2), operator communication network 104, and/or another network (not shown) determine an identity of clients 1108(1) and 1108(2), such as in a manner similar to that discussed above with respect to FIG. 10.

Although the same service profile is associated with streaming content application client 1108(1) in both local communication networks 1102(1) and 1102(2), the two local communication networks may have different capabilities, such as due to differences in shared network equipment 1106, access devices 116, and/or communication links 122. Consequently, streaming content application client 1108(1) may not receive identical communication service in local communication networks 1102(1) and 1102(2), even though streaming content application client 1108(1) has the same service profile in each local communication network 1102. For example, local communication network 1102(1) may be able to support a downlink communication bandwidth of 1 Gb/s, while local communication network 1102(2) may only be able to support a downlink communication bandwidth of 250 Mb/s. In this case, streaming content application client 1108(1) will receive different communication service in local communication network 1102(2) than in local communication network 1102(1), if streaming content application client 1108(1)'s service profile specifies a maximum communication bandwidth of greater than 250 Mb/s.

Figure 12:
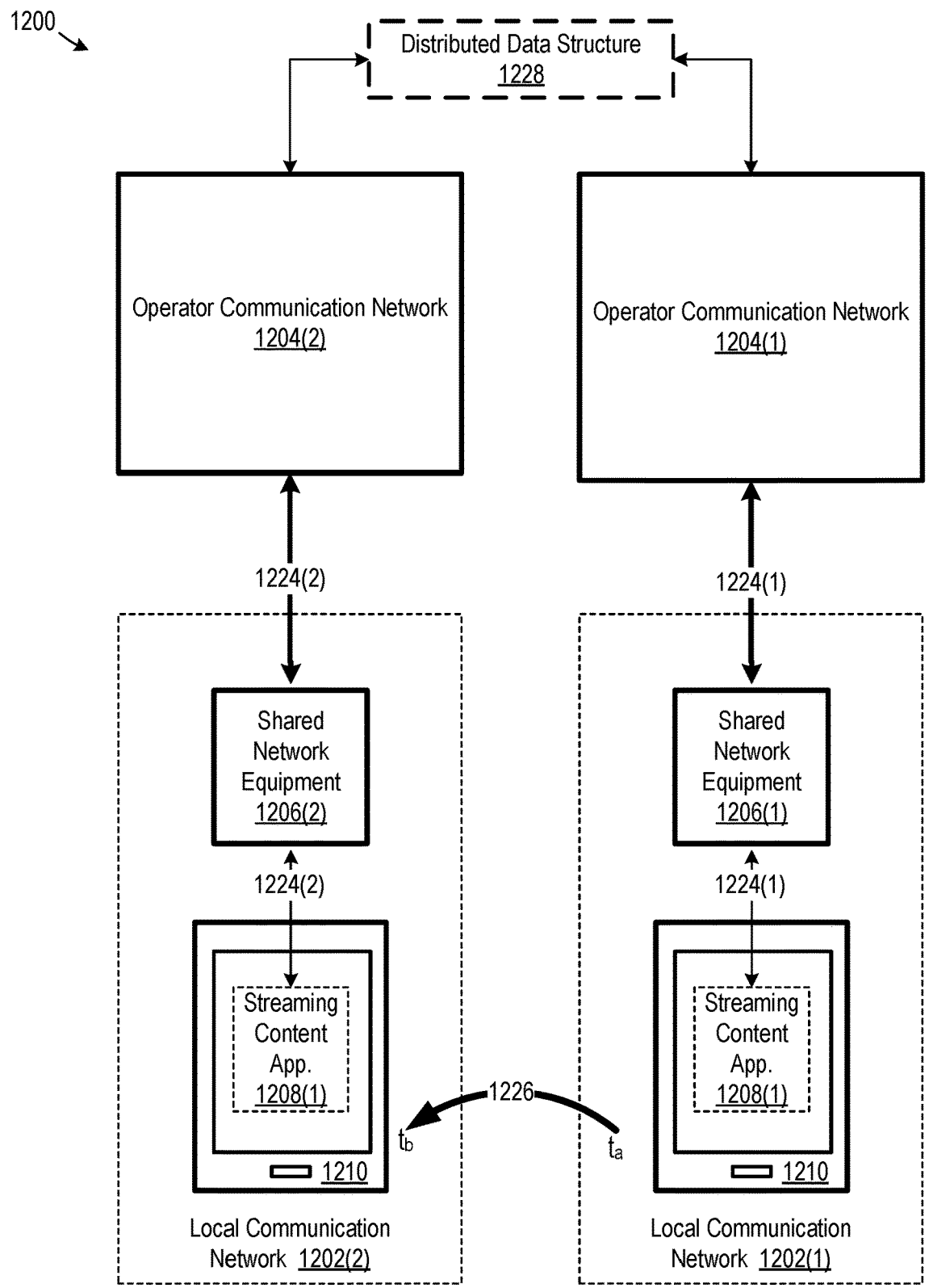
FIG. 12 is a block diagram of an embodiment of the FIG. 1 communication system configured to support roaming of clients among local communication networks that are served by different respective operator communication networks.

Client 1108(1) roams among local communication networks served by a common operator communication network in the FIG. 11 example. Some embodiments of the systems and methods disclosed herein are configured such that a client receives communication service in accordance with its respective service profile as the client roams among local communication networks served by different operator communication networks. For example, FIG. 12 is a block diagram of a communication system 1200, which is configured to support roaming of clients among local communication networks served by different respective operator communication networks. System 1200 includes an operator communication network 1204(1), an operator communication network 1204(2), a local communication network 1202(1), and a local communication network 1202(2). Operator communication networks 1204 are embodiments of operator communication network 104, and local communication networks 1202 are embodiments of local communication networks 102. Operator communication network 1204(1) serves local communication network 1202(1), and operator communication network 1204(2) serves local communication network 1202(2). The number of operator communication networks 1204 in system 1200, as well as the number of local communication networks 1202 support by each operator communication network 1204, may vary without departing from the scope hereof. Details of operator communication networks 1204 are not shown in FIG. 12.

Local communication network 1202(1) includes shared network equipment 1206(1), and at time $t_a$, local communication network 1202(1) further includes a streaming content application client 1208(1) operating on a tablet computer 1210. Local communication network 1202(1) may include additional clients 1208 without departing from the scope hereof. Shared network equipment 1206(1) is an embodiment of shared network equipment 106 of FIG. 1, and shared network equipment 1206(1) is communicatively coupled to an access device (not shown) of operator communication network 1204(1). At time $t_a$, local communication network 1202(1) transmits data 1224(1) between streaming content application client 1208(1) and operator communication network 1204(1) in accordance with a service profile associated with client 1208(1), e.g. service profile 400 of FIG. 4. Additionally, operator communication network 1204(1) transmits data 1224(1) in accordance with the service profile associated with client 1208(1). In some embodiments, shared network equipment 1206(1) additionally recognizes streaming content application client 1208(1) being communicatively coupled to local communication network 1202(1), and local communication network 1202(1), operator communication network 1204(1), and/or another network (not shown) determine an identity of client 1208(1), such as in a manner similar to that discussed above with respect to FIG. 10.

Local communication network 1202(2) includes shared network equipment 1206(2), but local communication network 1202(2) does not include any clients at time $t_a$. Shared network equipment 1206(2) is an embodiment of shared network equipment 106 of FIG. 1, and shared network equipment 1206(2) is communicatively coupled to an access device (not shown) of operator communication network 1204(2).

As discussed above, streaming content application client 1208(1) is in local communication network 1202(1) at time $t_a$. However, streaming content application client 1208(1) (and tablet computer 1210) roam from local communication network 1202(1) to local communication network 1202(2) at time $t_b$, as indicated by an arrow 1226. Local communication network 1202(2) then transmits data 1224(2) between streaming content application client 1108(1) and operator communication network 1204(2) in accordance with the same service profile associated with client 1208(1) in local communication network 1202(1), e.g. service profile 400 of FIG. 4. Additionally, operator communication network 1204 (2) transmits data 1224(2) in accordance with the same service profile. Consequently, streaming content application client 1208(1) receives consistent communication service as it roams from local communication network 1202(1) to local communication network 1202(2), even though the two local communication networks are served by different respective operator communication networks. In some embodiments, shared network equipment 1206(2) additionally recognizes streaming content application client 1208(1) being communicatively coupled to local communication network 1202(1), and local communication network 1202(2), operator communication network 1204(2), and/or another network (not shown) determine an identity of client 1208(1), such as in a manner similar to that discussed above with respect to FIG. 10.

It may be desirable to track data transportation by operator communication networks 1204 and/or by local communication networks 1202, such as to facilitate business arrangements associated with these communication networks. Accordingly, in some embodiments, a data structure 1228 is distributed among multiple computing devices, to record transmission of data by at least one of operator communication network 1204(1), operator communication network 1204(2), local communication network 1202(1), and local communication network 1202(2). In certain embodiments, data structure 1228 is configured according to blockchain principles, or other consensus-based principles, to help ensure integrity of information recorded by the data structure. Data structure 1228 may be at least partially separate from system 1200. In some embodiments, data structure 1228 is replaced by, or supplemented by, one or more different data storage structures, such as a database.

Referring again to FIG. 1, in some embodiments, a party associated with a given local communication network 102, e.g. a party owning or leasing a building where a local communication network 102 is deployed, may pay for some or all costs associated with operator communication network 104 providing communication service to the local communication network. Additionally, in some embodiments, a party associated with a given client 108, instead of a party associated with a given local communication network 102, may pay for some or all costs associated with operator communication network 104 and/or a local communication network 102 providing communication service to the client.

Combination of Features

Features described above may be combined in various ways without departing from the scope hereof. The following examples illustrate some possible combinations:

(A1) A method for providing individualized communication service may include (1) recognizing a first client being communicatively coupled to a first local communication network, (2) determining an identity of the first client, (3) transporting first data between the first client and a first operator communication network, using the first local communication network in accordance with a first service profile associated with the first client, and (4) transporting the first data using the first operator communication network in accordance with the first service profile.

(A2) The method denoted as (A1) may further include (1) recognizing a second client being communicatively coupled to the first local communication network, (2) determining an identity of the second client, (3) transporting second data between the second client and the first operator communication network, using the first local communication network in accordance with a second service profile associated with the second client, the second service profile being different from the first service profile, and (4) transporting the second data using the first operator communication network in accordance with the second service profile.

(A3) In the method denoted as (A2), transporting the first data between the first client and the first operator communication network may include transporting the first data using a first subnetwork of the first local communication network, and transporting the second data between the second client and the first operator communication network may include transporting the second data using a second subnetwork of the first local communication network.

(A4) In the method denoted as (A1), transporting the first data between the first client and the first operator communication network may include transporting the first data using a first subnetwork of the first local communication network.

(A5) The method denoted as (A1) may further include (1) recognizing a second client being communicatively coupled to the first local communication network, (2) recognizing a third client being communicatively coupled to the first local communication network, (3) transporting second data between the second client and the first operator communication network, using the first local communication network in accordance with a default service profile, and (4) transporting third data between the third client and the first operator communication network, using the first local communication network in accordance with the default service profile.

(A6) Any one of the methods denoted as (A1) through (A5) may further include (1) recognizing the first client being communicatively coupled to a second local communication network, (2) determining the identity of the first client, while the first client is communicatively coupled to the second local communication network, and (3) transporting additional data between the first client and the first operator communication network, using the second local communication system in accordance with the first service profile.

(A7) Any one of the methods denoted as (A1) through (A5) may further include (1) recognizing the first client being communicatively coupled to a second local communication network, (2) determining the identity of the first client, while the first client is communicatively coupled to the second local communication network, and (3) transporting additional data between the first client and a second operator communication network, using the second local communication network in accordance with the first service profile.

(A8) The method denoted as (A7) may further include recording transportation of the additional data by at least one of the second local communication network and the second operator communication network, using a data structure distributed among multiple computing devices.

(A9) In any one of the methods denoted as (A1) through (A8), determining the identity of the first client may include determining the identity of the first client using one or more security certificates associated with the first client.

(A10) In any one of the methods denoted as (A1) through (A9), the first service profile may specify one or more of communication bandwidth, communication latency, communication quality of service (QoS), communication volume, security service, data origination address controls, data destination address controls, and parental control service, associated with the first client.

(A11) In any one of the methods denoted as (A1) through (A10), transporting the first data using the first operator communication network may include transporting the first data in accordance with a Data Over Cable Service Interface Specification (DOCSIS) communication protocol in at least part of the first operator communication network.

(A12) In any one of the methods denoted as (A1) through (A10), transporting the first data using the first operator communication network may include transporting the first data in accordance with an optical communication protocol in at least part of the first operator communication network.

(B1) A method for providing individualized communication service may include (1) obtaining an identity of a first client communicatively coupled to a first local communication network, (2) transporting first data using a first operator communication network in accordance with a first service profile associated with the first client, (3) obtaining an identity of a second client communicatively coupled to the first local communication network, and (4) transporting second data using the first operator communication network in accordance with a second service profile associated with the second client, the second service profile being different from the first service profile.

(B2) The method denoted as (B1) may further include (1) obtaining the identity of the first client while the first client is communicatively coupled to a second local communication network that is different from the first local communication network, and (2) transporting additional data associated with the first client using the first operator communication network in accordance with the first service profile.

(B3) In any one of the methods denoted as (B1) and (B2), the first service profile may specify one or more of communication bandwidth, communication latency, communication quality of service (QoS), communication volume, security service, data origination address controls, data destination address controls, and parental control service, associated with the first client.

(B4) In any one of the methods denoted as (B1) through (B3), transporting the first data using the first operator communication network may include transporting the first data in accordance with a Data Over Cable Service Interface Specification (DOCSIS) communication protocol in at least part of the first operator communication network.

(B5) In any one of the methods denoted as (B1) through (B3), transporting the first data using the first operator communication network may include transporting the first data in accordance with an optical communication protocol in at least part of the first operator communication network.

(C1) A method for providing individualized communication service may include (1) recognizing a first client being communicatively coupled to a first local communication network, (2) obtaining an identity of the first client, (3) transporting first data between the first client and a first operator communication network, using the first local communication network in accordance with a first service profile associated with the first client, (4) recognizing a second client being communicatively coupled to the first local communication network, (5) obtaining an identity of the second client, and (6) transporting second data between the second client and the first operator communication network, using the first local communication network in accordance with a second service profile associated with the second client, the second service profile being different from the first service profile.

(C2) In the method denoted as (C1), transporting the first data between the first client and the first operator communication network may include transporting the first data using a first subnetwork of the first local communication network, and transporting the second data between the second client and the first operator communication network may include transporting the second data using a second subnetwork of the first local communication network.

(C3) In any one of the methods denoted as (C1) and (C2), the first service profile may specify one or more of communication bandwidth, communication latency, communication quality of service (QoS), communication volume, security service, data origination address controls, data destination address controls, and parental control service, associated with the first client.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for providing individualized communication service, comprising:
   determining an identity of a first client being communicatively coupled to a first local communication network;
   determining an identity of a second client being communicatively coupled to the first local communication network;
   transporting first data between the first client and a first operator communication network, using the first local communication network in accordance with a first service profile associated with the first client;
   transporting second data between the second client and the first operator communication network, using the first local communication network in accordance with a second service profile associated with the second client, the second service profile being different from the first service profile;
   transporting the first data using the first operator communication network in accordance with the first service profile; and
   transporting the second data using the first operator communication network in accordance with the second service profile.

2. The method of claim 1, wherein transporting the first data between the first client and the first operator communication network comprises transporting the first data using a first subnetwork of the first local communication network.

3. The method of claim 1, further comprising:
   recognizing the first client being communicatively coupled to a second local communication network;
   determining the identity of the first client, while the first client is communicatively coupled to the second local communication network; and
   transporting additional data between the first client and the first operator communication network, using the second local communication network in accordance with the first service profile.

4. The method of claim 1, further comprising:
   recognizing the first client being communicatively coupled to a second local communication network;
   determining the identity of the first client, while the first client is communicatively coupled to the second local communication network; and
   transporting additional data between the first client and a second operator communication network, using the second local communication network in accordance with the first service profile.

5. The method of claim 4, further comprising recording transportation of the additional data by at least one of the second local communication network and the second operator communication network, using a data structure distributed among multiple computing devices.

6. The method of claim 1, wherein determining the identity of the first client comprises determining the identity of the first client using one or more security certificates associated with the first client.

7. The method of claim 1, wherein the first service profile specifies one or more of communication bandwidth, communication latency, communication quality of service (QoS), communication volume, security service, data origination address controls, data destination address controls, and parental control service, associated with the first client.

8. The method of claim 1, wherein transporting the first data using the first operator communication network comprises transporting the first data in accordance with a Data Over Cable Service Interface Specification (DOCSIS) communication protocol in at least part of the first operator communication network.

9. The method of claim 1, wherein transporting the first data using the first operator communication network comprises transporting the first data in accordance with an optical communication protocol in at least part of the first operator communication network.

10. A method for providing individualized communication service, comprising:
    associating a first service profile with a first client communicatively coupled to a first local communication network;
    associating a second service profile with a second client communicatively coupled to the first local communication network, the second service profile being different from the first service profile;
    transporting first data associated with the first client using a first operator communication network, in accordance with the first service profile; and
    transporting second data associated with the second client using the first operator communication network, in accordance with the second service profile.

11. The method of claim 10, wherein the first service profile specifies one or more of communication bandwidth, communication latency, communication quality of service (QoS), communication volume, security service, data origination address controls, data destination address controls, and parental control service, associated with the first client.

12. The method of claim 11, wherein the second service profile specifies one or more of communication bandwidth, communication latency, communication QoS, communication volume, security service, data origination address controls, data destination address controls, and parental control service, associated with the second client.

13. The method of claim 10, wherein transporting the first data using the first operator communication network comprises transporting the first data in accordance with a Data Over Cable Service Interface Specification (DOCSIS) communication protocol in at least part of the first operator communication network.

14. The method of claim 10, wherein transporting the first data using the first operator communication network comprises transporting the first data in accordance with an optical communication protocol in at least part of the first operator communication network.

15. The method of claim 10, further comprising:
    recognizing the first client being communicatively coupled to a second local communication network; and transporting additional data associated with the first client using a second operator communication network in accordance with the first service profile.

16. The method of claim 10, wherein the first local communication network is communicatively coupled with the first operator communication network.

17. The method of claim 10, further comprising transporting the first data between the first client and the first operator communication network, using the first local communication network in accordance with the first service profile.

18. The method of claim 17, wherein transporting the first data between the first client and the first operator communication network comprises transporting the first data using a first subnetwork of the first local communication network.

19. The method of claim 17, further comprising transporting the second data between the second client and the first operator communication network, using the first local communication network in accordance with the second service profile.

20. The method of claim 19, wherein transporting the second data between the second client and the first operator communication network comprises transporting the second data using a second subnetwork of the first local communication network.

\* \* \* \* \*